United States Patent Office 2,945,818
Patented July 19, 1960

2,945,818

PROCESS FOR PREPARING SURFACE ACTIVE COMPOSITIONS

Raymond L. Costine, New Castle, and Robert W. Behrens, Wilmington, Del., assignors to Atlas Powder Company, Wilmington, Del., a corporation of Delaware No Drawing. Filed Feb. 1, 1955, Ser. No. 485,584

7 Claims. (Cl. 252—353)

This invention relates to the process of preparing emulsifiable compositions which are dispersible in water to form oil-in-water emulsions. More particularly, the invention pertains to the process of preparing nonionic-anionic mixtures of surface active agents which may be dissolved in oleaginous materials for the purpose of making such emulsifiable compositions.

Oil-in-water emulsions are in use in many arts and various emulsifying agents have been used for the purpose of forming such emulsions. It is known that mixtures of two types of surface active agents often give more stable oil-in-water emulsions than either of the surface active agents when used alone and in addition, that oils containing mixtures of emulsifiers dissolved therein frequently are self-dispersible and form oil-in-water emulsions quickly with little or no agitation. Mixtures containing various concentrations of two or more types of surface active agents have been disclosed for particular purposes in the various arts.

Combination emulsifiers in which one of the components is the salt of a sulfonated organic material and the other is a non-ionic surface active agent have, in particular, been found useful in the preparation of readily emulsifiable oil concentrates. Such concentrates are useful as cutting oils, as textile assistants, and particularly as carriers for herbicides and insecticides for agricultural purposes. Anionic-nonionic mixtures comprising calcium dodecyl benzene sulfonate and non-ionic emulsifiers which are derivatives of polyethylene or polypropylene glycol have found wide acceptance as emulsifiers for oil solutions of agricultural toxicants.

Considerable progress has been made in the development of anionic surface active agents, such as organic sulfates and organic sulfonates for use in the fields of detergents, wetting agents and emulsification. In composition, these agents vary from the sulfated and sulfonated natural oils, such as the petroleum and fatty oils to the alkyl aryl sulfonates and the aliphatic sulfates and sulfonates. For the purpose of this invention, the term sulfonated organic compounds will include both sulfonate and sulfate reaction products of sulfuric acid, sulfur tri-oxide, or oleum with said organic compounds.

In the preparation of salts of sulfonated organic compounds, as for example sulfonated alkyl benzene, it is common to first dilute the crude sulfonation mixture derived from the treatment of an aromatic hydrocarbon and oleum with benzene, kerosene, methylated benzenes or similar low boiling solvent. This causes a portion of the free sulfuric acid dissolved in the crude mixture to form a separate phase which can be drawn off. The remaining solvent solution containing the sulfonic acid and a minor amount of sulfuric acid is then neutralized and purified by appropriate washing, filtration and distillation procedures. The neutralization of sulfonated dodecyl benzene with calcium hydroxide, however, after removal of the spent sulfuric acid separated by dilution with a solvent, presents serious problems. The neutralization does not proceed readily unless a co-solvent such as butyl alcohol or isopropyl alcohol is used to maintain a homogeneous reaction mixture. Further, it is usually necessary to filter the solution to remove insoluble calcium sulfate formed by the reaction of calcium hydroxide and free sulfuric acid left in the mixture after acid separation. This filtration is exceedingly slow and difficult unless the neutralized solution contains approximately 10 percent water and appropriate alcohol to lower the viscosity and reduce the tendency of the calcium sulfonate salt to form a gel. Also, the presence of alcohol in the solvent stripped from the filtered product is highly undesirable since it precludes re-use of the solvent for spent acid separation, and a fractionation step must be incorporated in the solvent recovery system to separate alcohol and the hydrocarbon solvent.

An object of this invention is to provide a novel process for preparing mixed anionic-nonionic emulsifiers.

Another object is to provide a process for neutralizing sulfonated organic compounds which results in the product of mixed anionic-nonionic emulsifiers.

The above and other objects of the invention will become more apparent in the course of the following description and in the appended claims.

In order to accomplish the above objects in accordance with the invention, the neutralization of a sulfonated organic compound, which forms the anionic component of an anionic-nonionic emulsifier mixture, is carried out, at least in part, in the presence of the nonionic surface active component of said mixture.

If an appropriate amount of a non-ionic emulsifier is added to the solvent solution of a sulfonic acid prior to the neutralization step, it is found that no alcohol is required to maintain a homogeneous reaction mixture upon the addition of calcium hydroxide slurry. Neutralization proceeds easily and subsequent filtration is rapid. The excess solvent stripped from the neutralized and filtered solution thus contains only hydrocarbon and water from which the water separates and may be discarded. The hydrocarbon solvent is suitable for re-use in the process.

Among the non-ionic surfactants useful in the practice of the present invention are the higher fatty acid partial esters of polyhydric alcohols such, for example, as lauric, acid, palmitic acid, oleic acid, stearic acid and tall oil partial esters of glycerol, or of the hexitols, or of anhydrized hexitols. The products obtained by etherification of the free hydroxyls of said esters with ethylene oxide to render them water-dispersible or water-soluble are nonionic surfactants which have likewise been found effective in the practice of the invention.

Still other non-ionic agents utilized in accordance with the present invention are higher fatty acid esters of polyoxyethylene glycols and higher fatty acid esters of hexitol polyoxyethylene ethers such, for example, as polyoxyethylene glycol stearate or polyoxyethylene glycol laurate, the hexaoleate of sorbitol polyoxyethylene ether containing 40 to 50 oxyethylene groups per mol, and the like.

The higher fatty alcohol ethers of polyoxyethylene glycols such, for example, as polyoxyethylene lauryl alcohol are also useful in the same manner.

Other non-ionic products effective for use in this invention in the manner described are the higher molecular weight alkyl phenol polyglycol ethers, polyoxyethylene ethers of higher alkyl mercaptans, polyoxyethylene fatty amines, polyoxyethylene fatty amides and the like.

Compounds falling in the category of the anionic emulsifier produced by the process of this invention are the salts of alkyl aryl sulfonic acids containing from 8 to 18 carbon atoms in the alkyl radical and sulfated hydroxy compounds containing at least one hydrocarbon chain having 8 to 18 carbon atoms. The said salts may be alkali metal, alkaline earth metal or ammonium salts.

Specific salts coming within the above definition include sodium octadecyl benzene sulfonate, calcium dinonyl naphthalene sulfonate, calcium polydodecyl benzene sulfonate, barium dodecyl benzene sulfonate, ammonium dinonyl napthalene sulfonate, sodium salt of sulfated castor oil and potassium lauryl sulfate.

The invention is particularly applicable to the alkaline earth salts of alkyl aryl sulfonic acid containing from 12 to 16 carbon atoms in the alkyl group. The calcium and magnesium salts of dodecyl benzene sulfonic acid may be named as specifically desirable materials in the practice of this invention in the manner described.

The invention is specifically illustrated by the following examples which are not to be construed as limiting the scope of the invention.

EXAMPLE 1

1800 grams of 20% oleum is added to 1500 grams of dodecyl benzene with agitation and cooling so as to maintain sulfonation temperature at 35–40° C. The sulfonation charge is further reacted for one hour at 45–50° C. followed by one hour at 50–55° C. The sulfonated mixture containing approximately 1270 grams of excess sulfuric acid in the sulfonic acid is added to 4350 grams of trimethyl benzene and 210 grams of water with agitation and cooling at 30–40° C. The mixture is permitted to stand for approximately 8 hours to settle out the spent sulfuric acid. The water which is added with the solvent is necessary to dilute the spent acid of 80–83%, which is the concentration that gives optimum separation of spent acid with a minimum of product loss. At the end of the settling period, approximately 1500 grams of spent acid containing about 1220 grams of 100% sulfonic acid is removed as a bottom layer from beneath the sulfonic acid-trimethyl benzene solution.

To the upper layer, containing the sulfonic acid-trimethyl benzene solution, 3870 grams of polyoxyethylene ether of sorbitan mono tall oil ester containing approximately 16 oxyethylene groups per mol is added with agitation and cooling so as to maintain the temperature below 40° C. The charge weight of polyoxyethylene sorbitan mono tall oil ester containing approximately 16 oxyethylene groups per mol is based on a 35/65 ratio of calcium salt of dodecyl benzene sulfonate to the polyoxyethylene sorbitan mono tall oil ester.

Approximately 900 grams of lime slurry (250 grams chemical grade hydrated lime plus 650 grams of water) are added at a moderate rate. Temperature during the neutralization period is permitted to rise to 60–65° C. at which temperature, small increments of lime slurry are added until a 20% solution of the product shows a pH of 7.0 to 7.5. Neutralization by this procedure is rapid and the final pH is relatively stable. The neutral charge is then filtered to remove calcium sulfate and excess lime. Approximately 100 grams of diatomaceous earth is added to the charge and mixed in as a filter aid. The charge is heated to 80° C. and filtered through a precoated filter press. Finally the dilute emulsifier is vacuum stripped to remove water and excess trimethyl benzene. The final concentration is adjusted to 75% total emulsifier content, with the other 25% being essentially trimethyl benzene solvent.

A modification of the above process may be employed in some cases wherein 1/3 to 1/2 of the lime slurry is introduced before addition of the non-ionic surface active agents, after which neutralization is completed. This method is particularly useful if the non-ionic emulsifier is susceptible to attack by the strong acid of the crude sulfonation mixture as, for example, by acid hydrolysis of an ester linkage.

EXAMPLE 2

1800 grams of 20% oleum is added to 1500 grams of dodecyl benzene with agitation and cooling so as to maintain sulfonation temperature at 35–40° C. The sulfonation charge is further reacted for one hour at 45–50° C. followed by one hour at 50–55° C. The sulfonated mixture containing approximately 1270 grams of excess sulfuric acid in the sulfonic acid is added to 4350 grams of trimethyl benzene and 210 grams of water with agitation and cooling at 30–40° C. The mixture is permitted to stand for approximately 8 hours to settle out the spent sulfonic acid. The water which is added with the solvent is necessary to dilute the spent acid to 80–83%, which is the concentration that gives optimum separation of spent acid with a minimum of product loss. At the end of the settling period, approximately 1500 grams of spent acid containing about 1220 grams of 100% sulfonic acid is removed as a bottom layer from beneath the sulfonic acid-trimethyl benzene solution.

To the upper layer containing the sulfonic acid trimethyl benzene solution, 2085 grams of the hexaoleate of sorbitol polyoxyethylene ether containing approximately 50 oxyethylene groups per mol is added with agitation and cooling so as to maintain the temperature below 40° C. The charge weight of sorbitol hexaoleate containing approximately 50 mols of ethylene oxide, is based on a 50/50 ratio of calcium dodecyl benzene sulfonate to the sorbitol hexaoleate.

Approximately 900 grams of lime slurry (250 grams chemical grade hydrated lime plus 650 grams of water) are added at a moderate rate. Temperature during the neutralization period is permitted to rise to 60–65° C. at which temperature small increments of lime slurry are added until a 20% solution of the product shows a pH of 7.0 to 7.5. Neutralization by this procedure is rapid and the final pH is relatively stable. The neutral charge is then filtered to remove calcium sulfate and excess lime. Approximately 100 grams of diatomaceous earth is added to the charge and mixed in as a filter aid. The charge is heated to 80° C. and filtered through a precoated filter press. Finally the dilute emulsifier is vacuum stripped to remove water and excess trimethyl benzene. Total emulsifying content is adjusted to about 70% with the remaining 30% being trimethyl benzene.

EXAMPLE 3

1720 grams of 20% oleum is added to 1000 grams of polydodecyl benzene with agitation and cooling so as to maintain sulfonation temperature at 55–60° for one hour. The sulfonated mixture is permitted to stand for approximately 1 to 8 hours to settle out the spent sulfuric acid which is removed as a bottom layer from beneath the sulfonic acid.

Approximately 400 grams of lime slurry (110 grams chemical grade hydrated lime plus 290 grams of water) are added at a moderate rate.

To the half neutralized sulfonic acid is added 2610 grams of trimethyl benzene and 2000 grams of polyoxyethylene ether of sorbitan mono tall oil ester containing approximately 16 oxyethylene groups per mol with agitation and cooling so as to maintain the temperature below 40° C. The charge weight of polyoxyethylene sorbitan mono tall oil ester containing approximately 16 oxyethylene groups per mol, is based on a 35/65 ratio of calcium polydodecyl benzene sulfonate to the polyoxyethylene sorbitan mono tall oil ester.

Neutralization is completed upon the addition of 400 grams of lime slurry at a moderate rate and the temperature during the neutralization period is permitted to rise to 60–65° C. The final product shows a pH of 7.0 to 7.5 and is relatively stable. The neutral charge is then filtered to remove calcium sulfate and excess lime. Approximately 100 grams of diatomaceous earth is added to the charge and mixed in as a filter aid. The charge is heated to 80° C. and filtered through a precoated filter press.

Finally the dilute emulsifier is vacuum stripped to remove water and excess trimethyl benzene. The final concentration is adjusted to 75% total emulsifier content with the other 25% being essentially trimethylene benzene solvent.

EXAMPLE 4

1235 grams of 20% oleum is added to 1000 grams of dinonyl naphthalene with agitation and cooling so as to maintain sulfonation temperature at 55–60° C. The sulfonated mixture is added to 2610 grams of trimethyl benzene and 140 grams of water with agitation and cooling at 30–40° C. The mixture is permitted to stand for approximately 1–8 hours to settle out the spent sulfuric acid which is removed from beneath the sulfonic acid-trimethyl benzene solution.

To the upper layer, containing the sulfonic acid-trimethyl benzene solution, 1430 grams of polyoxyethylene ether of sorbitan mono tall oil ester containing approximately 16 oxyethylene groups per mol is added with agitation and cooling so as to maintain the temperature below 40° C. The charge weight of polyoxyethylene sorbitan mono tall oil ester containing approximately 16 oxyethylene groups per mol is based on a 35/65 ratio of calcium dinonyl naphthalene to the polyoxyethylene sorbitan mono tall oil ester.

Approximately 300 grams of lime slurry (85 grams chemical grade hydrated lime in 215 grams of water) are added at a moderate rate. Temperature during the neutralization period is permitted to rise to 60–65° C. at which temperature small increments of lime slurry are added until a 20% solution of the product shows a pH of 7.0 to 7.5. Neutralization by this procedure is rapid and the final pH is relatively stable. The neutral charge is then filtered to remove calcium sulfate and excess lime. Approximately 100 grams of diatomaceous earth is added to the charge and mixed in as a filter aid. The charge is heated to 80° C. and filtered through a precoated filter press. Finally the dilute emulsifier is vacuum stripped to remove water and excess trimethyl benzene. The final concentration is adjusted to 75% total emulsifier content with the other 25% being essentially trimethyl benzene solvent.

EXAMPLE 5

520 grams of 20% oleum is added to 520 grams of castor oil with agitation and cooling so as to maintain sulfonation temperature at 40–50° C. The sulfonated product is added to 2260 grams of trimethyl benzene and 260 grams of water with agitation and cooling at 30–40° C. The mixture is permitted to stand for approximately 1 to 8 hours to settle out the sulfuric acid. At the end of the settling period the sulfuric acid is removed as a bottom layer from beneath the sulfated castor oil-trimethyl benzene solution.

To the upper layer, containing the sulfated castor oil-trimethyl benzene solution, 800 grams of polyoxyethylene ether of sorbitan mono tall oil ester containing approximately 16 oxyethylene groups per mol is added with agitation and cooling so as to maintain the temperature below 40° C. The charge weight of polyoxyethylene sorbitan mono tall oil ester containing approximately 16 oxyethylene groups per mol, is based on a 35/65 ratio of the calcium salt of sulfated castor oil to the polyoxyethylene sorbitan mono tall oil.

Approximately 70 grams of lime slurry (20 grams chemical grade hydrated lime plus 50 grams of water) are added at a moderate rate. Temperature during the neutralization period is permitted to rise to 60–65° C. at which temperature small increments of lime slurry are added until a 20% solution of the product shows a pH of 7.0 to 7.5. Neutralization by this procedure is rapid and the final pH is relatively stable.

The neutral charge is then filtered to remove calcium sulfate and excess lime.

Approximately 50 grams of diatomaceous earth is added to the charge and mixed in as a filter aid. The charge is heated to 80° C. and filtered through a precoated filter press.

Finally the dilute emulsifier is vacuum stripped to remove water and excess trimethyl benzene. The final concentration is adjusted to 75% total emulsifier content with the other 25% being essentially trimethylene benzene solvent.

EXAMPLE 6

410 grams of $SO_3$ vapor (10% concentration by volume in air) is added to 1000 grams of lauryl alcohol with agitation and cooling so as to maintain sulfonation temperature at 25–35° C.

The sulfonated product is added to 2610 grams of trimethyl benzene and 2670 grams of polyoxyethylene ether of sorbitan mono tall oil ester containing approximately 16 oxyethylene groups per mol with agitation and cooling so as to maintain the temperature below 40° C.

Approximately 700 grams of lime slurry (200 grams of chemical grade hydrated lime plus 500 grams of water) are added at a moderate rate. Temperature during the neutralization period is permitted to rise to 60–65° at which temperature small increments of lime slurry are added until a 20% solution of the product shows a pH of 7.0 to 7.5. Neutralization by this procedure is rapid and the final pH is relatively stable.

The neutral charge is then filtered to remove calcium sulfate and excess lime. Approximately 100 grams of diatomaceous earth is added to the charge and mixed in as a filter aid. The charge is heated to 80° C. and filtered through a precoated filter press. Finally the dilute emulsifier is vacuum stripped to remove water and excess trimethyl benzene. The final concentration is adjusted to 75% total emulsifier content with the other 25% being essentially trimethyl benzene solvent.

The above examples suffice to illustrate the invention amply, and multiplication of the number of examples illustrating in detail the preparation of an emulsifying composition of the nonionic-anionic type will be avoided. Other specific nonionic-anionic emulsifier combinations which may be prepared in accordance with the present invention are presented in tabular form in the following table.

*Table*

| Example | Sulfonic Acid of— | Non-ionic Emulsifier | Base | Neutralization | Filtration |
|---|---|---|---|---|---|
| 7 | Dodecyl benzene | 4 oxyethylene lauryl alcohol | $Ca(OH)_2$ | Fast | Very Fast. |
| 8 | do | 10 oxyethylene nonyl phenol | $Ca(OH)_2$ | do | Do. |
| 9 | do | 9 oxyethylene castor oil | $Ca(OH)_2$ | do | Fast. |
| 10 | do | 10 oxyethylene ether of sorbitan mono tall oil | $Ca(OH)_2$ | do | Do. |
| 11 | do | do | LiOH | do | Do. |
| 12 | do | do | $Mg(OH)_2$ | do | Moderate. |
| 13 | do | do | $NH_4OH$ | do | Very Fast. |
| 14 | do | do | $Ba(OH)_2$ | do | Fast. |
| 15 | do | glycerol monooleate | $Ca(OH)_2$ | do | Do. |
| 16 | do | 10 oxyethylene tallow fatty amine | $Ca(OH)_2$ | do | Do. |
| 17 | do | Hexaoleate of sorbitol polyoxyethylene ether containing 40 oxyethylene groups per mol. | $Ca(OH)_2$ | do | Do. |
| 18 | Castor Oil | 16 oxyethylene ether of sorbitan mono tall oil. | $Mg(OH)_2$ | do | Do. |

To a trimethyl benzene solution of a sulfonic acid in column 2 is added sufficient non-ionic surface active agent in column 3 to provide a ratio of sulfonic acid salt to nonionic of 35/65. Neutralization and filtration comments are found in columns 5 and 6 with the aqueous base listed in column 4. The number of mols of ethylene oxide in the non-ionic surface active agent is indicated by a numerical prefex to the word oxyethylene.

It is understood that any of the non-ionic surfactants mentioned hereinbefore may be utilized, according to the invention, with any of the anionic surface active agents set forth. The ratio of non-ionic to anionic being in the range of from 40/60 to 75/25 with the preferred ratio lying from 50/50. A particularly preferable ratio of non-ionic to anionic being 65/35.

A nonionic-anionic emulsifying composition produced in accordance with this invention is added to a toxicant composition of 65 parts by weight of toxaphene and 25 parts by weight of kerosene and stirred until clear. The toxicant concentrate produces a stable emulsion upon the addition to water which forms rapidly and without agitation. In use, the desired or requisite amount of toxicant concentrate is poured into a predetermined amount of water and the resulting emulsion is then ready for application by spraying or in any other desired manner.

The invention has been described in detail. No unnecessary limitations should by reason thereof be inferred and it should be understood that the scope of the invention is not to be limited thereby except as pointed out in the appended claims.

What is claimed as new and desired to protect by Letters Patent of the United States is:

1. The process of preparing a salt of an orginac compound selected from the group consisting of an alkylaryl sulfonic acid containing from 8 to 18 carbon atoms in the alkyl radical and a sulfated hydroxy compound containing at least one hydrocarbon chain having from 8 to 18 carbon atoms which comprises adding to a hydrocarbon solvent solution of said organic compound containing sulphuric acid an aqueous slurry of an inorganic base and a synthetic non-ionic surface active agent in an amount sufficient to provide a weight ratio of said surface active agent to said organic compound between about 40/60 to about 75/25 whereby a composition composed of an inorganic compound and a homogeneous reaction mixture of solvent, surface active agent and salt of an organic compound is produced, and filtering precipitated inorganic sulfate from said reaction mixture.

2. The process of preparing a salt of an organic compound as in claim 1 wherein said inorganic base is an alkaline earth base and said organic solvent is methylated benzene.

3. The process of preparing a salt of an organic compound as in claim 1 wherein said organic compound is an alkyl benzene sulfonic acid and said non-ionic surface active agent is an ether of sorbitan mono tall oil.

4. A process of preparing a salt of an organic compound as in claim 1 wherein said organic compound is dodecylbenzene sulfonic acid, said non-ionic surface active agent is polyoxyethylene ether of sorbitan mono tall oil containing 16 oxyethylene groups per mol of tall oil and said inorganic base is calcium hydroxide.

5. The process of preparing a salt of dodecylbenzene sulfonic acid which comprises adding to a trimethyl benzene solution of said dodecylbenzene sulfonic acid an aqueous slurry of calcium hydroxide and a synthetic non-ionic surface active agent consisting of polyoxyethylene ether of sorbitan mono tall oil containing approximately 60 oxyethylene groups per mol of tall oil in an amount sufficient to provide a ratio of said polyoxyethylene ether of sorbitan mono tall oil to said dodecylbenzene sulfonic acid of from about 40/60 to about 75/25 whereby a composition composed of inorganic compounds and a homogeneous reaction mixture of trimethyl benzene, polyoxyethylene ether of sorbitan mono tall oil and calcium dodecylbenzene sulfonic acid is produced, and filtering precipitated inorganic sulfate from said reaction mixture.

6. The process of preparing a salt of dodecylbenzene sulfonic acid as in claim 5 wherein said synthetic non-ionic surface active agent is the hexaoleate of sorbitol polyoxyethylene ether containing approximately 40 oxyethylene groups per mol of sorbitol hexaoleate.

7. The process of preparing a salt of dodecylbenzene sulfonic acid as in claim 5 wherein said synthetic non-ionic surface active agent is the hexaoleate of sorbitol polyoxyethylene ether containing approximately 50 oxyethylene groups per mol of sorbitol hexaoleate.

References Cited in the file of this patent

UNITED STATES PATENTS

| | | |
|---|---|---|
| 2,453,690 | Bray | Nov. 16, 1948 |
| 2,477,383 | Lewis | July 26, 1949 |
| 2,595,557 | Worth et al. | May 6, 1952 |
| 2,708,182 | Jahn | May 10, 1955 |

FOREIGN PATENTS

| | | |
|---|---|---|
| 720,195 | Great Britain | Dec. 15, 1954 |